(12) United States Patent
Jiang et al.

(10) Patent No.: US 11,317,467 B2
(45) Date of Patent: Apr. 26, 2022

(54) METHOD FOR ELECTING ROOT NODE IN MESH NETWORK

(71) Applicant: Espressif Systems (Shanghai) Co., Ltd., Shanghai (CN)

(72) Inventors: Jiangjian Jiang, Shanghai (CN); Yuexia Qi, Shanghai (CN)

(73) Assignee: Espressif Systems (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/619,302

(22) PCT Filed: Jan. 8, 2019

(86) PCT No.: PCT/CN2019/070733
§ 371 (c)(1),
(2) Date: Dec. 4, 2019

(87) PCT Pub. No.: WO2019/149034
PCT Pub. Date: Aug. 8, 2019

(65) Prior Publication Data
US 2020/0359453 A1     Nov. 12, 2020

(30) Foreign Application Priority Data

Jan. 30, 2018    (CN) .......................... 201810088069.2

(51) Int. Cl.
*H04W 84/18*         (2009.01)
*H04L 12/753*        (2013.01)
(Continued)

(52) U.S. Cl.
CPC ............. *H04W 84/18* (2013.01); *H04L 45/48* (2013.01); *H04W 4/06* (2013.01); *H04W 40/02* (2013.01); *H04W 40/246* (2013.01)

(58) Field of Classification Search
CPC ....... H04W 84/18; H04W 4/06; H04W 40/02; H04W 40/246; H04W 8/005; H04W 84/20; H04W 40/12; H04W 40/24; H04W 40/22; H04L 45/48
See application file for complete search history.

(56) References Cited

U.S. PATENT DOCUMENTS 7,417,973 B1     8/2008  Whitby-Strevens
9,220,050 B2 *  12/2015  Kelsey ................ H04W 40/244
(Continued)

FOREIGN PATENT DOCUMENTS

CN      102256303      11/2011
CN      102307347       1/2012
(Continued)

OTHER PUBLICATIONS

Wang Jian-Lin, Wang Xue-Ling; Choose Root Tree Algorithm Based TAN Classifiers; Journal of Binzhou University, vol. 24, No. 3; Jun. 2008.

*Primary Examiner* — Sharmin Chowdhury
(74) *Attorney, Agent, or Firm* — Reinhart Boerner Van Deuren P.C.

(57) ABSTRACT

Disclosed is a method for electing a root node in a mesh network, comprising the steps of: S1) when it is determined that there is no root node in the mesh network, all devices separately broadcast and transmit real-time signal strengths between the devices and a router; S2) all devices separately perform a first scanning, and each device elects, according to received real-time signal strengths between the other devices and the router and the real-time signal strength between the device and the router, a device having a maximum real-time signal strength as a root node candidate and broadcasts and transmits the same; and S3) all devices separately perform another scanning, and each device elects, according to the received root node candidates respectively elected by the other devices, a root node candidate having a maximum signal strength as a new root node candidate and (Continued)

broadcasts and transmits the same again until a unique root node is elected. According to the present invention, signal strengths and other information of devices may be transferred to one another in an entire mesh network, such that all devices may participate in comparison and voting to elect an optimal root node.

6 Claims, 2 Drawing Sheets

(51) Int. Cl.
*H04W 4/06* (2009.01)
*H04W 40/02* (2009.01)
*H04W 40/24* (2009.01)
*H04L 45/48* (2022.01)

(56) References Cited

U.S. PATENT DOCUMENTS

2011/0228789 A1    9/2011   Jia
2015/0341331 A1*   11/2015   Weksler .............. H04W 12/122
                                                                                                 726/4
2017/0359766 A1*   12/2017   Agiwal ................ H04W 40/12

FOREIGN PATENT DOCUMENTS

| CN | 102547982 | 7/2012 |
| CN | 104602289 | 5/2015 |
| CN | 105282817 | 1/2016 |
| CN | 108347701 | 7/2018 |

\* cited by examiner

METHOD FOR ELECTING ROOT NODE IN MESH NETWORK

TECHNICAL FIELD

The present invention relates to a wireless communication network technology, and particularly to a method for electing a root node in a mesh network as an egress device.

BACKGROUND ART

In order to lessen the load put on a router by wireless devices, one and only one root node is required within a mesh network (wireless mesh network) to act as an egress device for accessing the Internet by connecting to the router. In the mesh network, each of all devices that scan and find the router may be connected to the router and become a root node. The connectivity and communication quality between the router and the root node are of critical importance, as the root node acts as the only egress device in the mesh network in communication with the external Internet. Therefore, a current problem in need of solution is how to find and determine a device with optimal communication quality among all devices in the mesh network to act as the root node.

Based on the aforementioned background, the present invention provides a method for electing a root node in a mesh network, which enables devices unscannable with respect to each other to share information of root node candidates via device messaging; finally elects the only root node through convergence of network information, and allows the device elected as the root node to have the optimal connectivity and communication quality in the mesh network, so as to effectively solve drawbacks and limitations in existing technologies.

SUMMARY OF THE INVENTION

An object of the present invention is to provide a method for electing a root node in a mesh network, wherein the root node is generated by scanning devices in the network, comparing signal strengths, and voting. The signal strengths and other information of the devices may be transferred to one another in an entire mesh network, such that all devices may participate in comparison and voting to elect an optimal root node.

For achieving the aforementioned object, the present invention provides a method for electing a root node in a mesh network, including the steps of:

S1) when it is determined that there is no root node in the mesh network, all devices in the mesh network separately broadcast and transmit real-time signal strengths between the devices and a router;

S2) all devices in the mesh network separately perform a first scanning, and each device elects, according to received real-time signal strengths between other devices and the router as well as a real-time signal strength between the device and the router, a device having a maximum real-time signal strength as a root node candidate and broadcasts and transmits the root node candidate; and S3) all devices in the mesh network separately perform another scanning, and each device elects, from received root node candidates respectively elected by other devices, a root node candidate having a maximum signal strength as a new root node candidate and broadcasts and transmits the new root node candidate again until a unique root node in the mesh network is elected.

The step S specifically includes the steps of:

S11) in the mesh network, each device separately periodically broadcasts and transmits the real-time signal strength between the device itself and a router via a beacon, to all the other devices; and S12) in the mesh network, each device that has received probe request packets from the other devices separately replies to all requesting devices by sending thereto the real-time signal strength between the device itself and the router via a probe response packet.

The step S2 specifically includes the steps of:

S21) in the mesh network, all devices separately perform the first scanning, and extract, from received probe response packets and beacons transmitted by all the other devices, the real-time signal strength between each of all the other devices and the router;

S22) each device separately compares the received real-time signal strengths between the other devices and the router and the real-time signal strength between the device itself and the router, and elects therefrom a device having the maximum real-time signal strength as the root node candidate; and S23) each device that has received probe request packets transmitted from the other devices unicasts and transmits a MAC address of the root node candidate elected by the device as well as the real-time signal strength between the root node candidate and the router, via a probe response packet, to all the other requesting devices, and periodically broadcasts and transmits the MAC address and the real-time signal strength, via a beacon, to all the other devices, so as to complete voting for the root node candidate.

The step S3 specifically includes the steps of:

S31) in the mesh network, all devices separately perform the another scanning, and extract, from the received probe response packets and beacons transmitted by all the other devices, the root node candidate elected by each of the other devices;

S32) according to the root node candidates elected by all the other devices, it is determined whether there is only the unique root node candidate; if so, this root node candidate actively connects to the router and acts as a formal root node in the mesh network; otherwise it proceeds to S33;

S33) according to the root node candidates elected by all the other devices, each device counts a number of votes for electing itself;

S34) each device separately compares the real-time signal strength between the device itself and the router and the real-time signal strengths between the root node candidates elected by all the other devices and the router, and elects therefrom a candidate having the maximum real-time signal strength as the new root node candidate; and S35) each device that has received probe request packets transmitted from the other devices unicasts and transmits a MAC address of the new root node candidate elected by the device as well as the real-time signal strength between the root node candidate and the router, via a probe response packet, to all the other requesting devices, and periodically broadcasts and transmits the MAC address and the real-time signal strength, via a beacon, to all the other devices, so as to complete a new round of voting for the root node candidate, and then it returns to S31.

In the step S33, if, after counting, a certain device is found to be elected as the root node candidate in information received from all the other devices, this device actively connects to the router and acts as the formal root node in the mesh network.

In the method for electing a root node in a mesh network according to the present invention, when there is already a root node in the mesh network and the root node is not an optimal root node, then before the step S1, the method further includes: S0) any device in the mesh network initiates a takeover request which is then broadcast and transmitted by an existing root node; and after the step S3, the method further includes: S4) the elected new root node takes over the existing root node and connects to the router.

The step S0 specifically includes the steps of:

S01) any other device in the mesh network initiates the takeover request to the existing root node, or the existing root node actively initiates the takeover request;

S02) the existing root node broadcasts and transmits information about its upcoming termination; and S03) the other devices in the mesh network receive the information broadcast and transmitted by the existing root node about its upcoming termination, and determine that there will be no root node in the mesh network.

The step S4 specifically includes the steps of:

S41) the elected new root node actively transmits the root node takeover request to the existing root node;

S42) after receiving the takeover request, the existing root node replies to the new root node with confirmation information and actively disconnects from the router;

S43) the existing root node reselects a device in the mesh network as a parent node and connects to the parent node; and S44) after receiving the confirmation information, the new root node disconnects existing connections with the other devices, actively connects to the router, and becomes the formal root node in the mesh network.

In summary, the method for electing a root node in a mesh network according to the present invention is a method for generating the root node by scanning devices in the network, comparing signal strengths, and voting, wherein signal strengths and other information of devices may be transferred to one another in an entire mesh network, so that all devices may participate in comparison and voting to elect an optimal root node, so as to effectively avoid the occurrence of multiple root nodes due to failure of scanning each other among devices in the network and thus failing to directly compare the signal strength values between each of all the devices and the router.

DETAILED DESCRIPTION OF THE PREFERRED EMBODIMENTS

The present invention is further described through particular embodiments in combination with accompany drawings, with the embodiments being merely for illustrating the present invention, rather than limiting the protection scope of the present invention.

Figure 1:
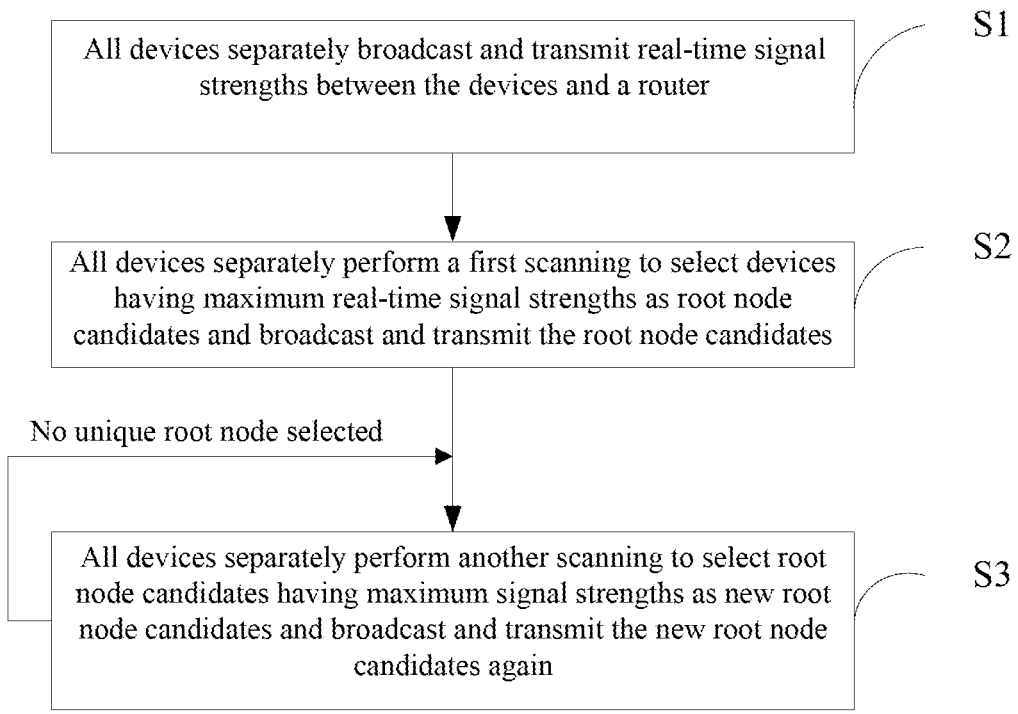
FIG. 1 is a flowchart of a method for electing a root node when there is no root node in the mesh network according to the present invention.

As shown in FIG. 1, the method for electing a root node in a mesh network according to the present invention includes the steps of:

S1) when it is determined that there is no root node in the mesh network, all devices in the mesh network separately broadcast and transmit real-time signal strengths between the devices and a router;

S2) all devices in the mesh network separately perform a first scanning, and each device elects, according to received real-time signal strengths between other devices and the router as well as a real-time signal strength between the device and the router, a device having a maximum real-time signal strength as a root node candidate and broadcasts and transmits the root node candidate; and S3) all devices in the mesh network separately perform another scanning, and each device elects, from received root node candidates respectively elected by other devices, a root node candidate having a maximum signal strength as a new root node candidate and broadcasts and transmits the new root node candidate again until a unique root node in the mesh network is elected.

The step S1 specifically includes the steps of:

S11) in the mesh network, each device separately periodically broadcasts and transmits the real-time signal strength between the device itself and a router via a beacon (Beacon), to all the other devices;

S12) in the mesh network, each device that has received probe request packets (Probe Request) transmitted by the other devices separately replies to all requesting devices by sending thereto the real-time signal strength between the device itself and the router via the probe response packet (Probe Response).

Figure 2:
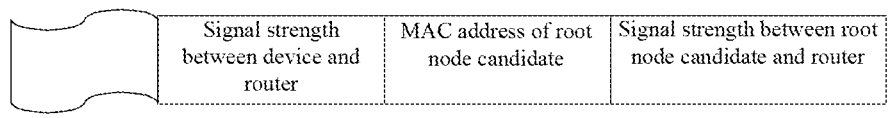
FIG. 2 is a schematic structure diagram of a probe response packet and a beacon according to the present invention.

The step S2 specifically includes the steps of:

S21) in the mesh network, all devices separately perform the first scanning, and extract, from received probe response packets and beacons transmitted by all the other devices, the real-time signal strength between each of all the other devices and the router;

S22) each device separately compares the received real-time signal strengths between the other devices and the router and the real-time signal strength between the device itself and the router, and elects therefrom a device having the maximum real-time signal strength as the root node candidate; and S23) each device that has received probe request packets transmitted from the other devices unicasts and transmits a MAC address of the root node candidate elected by the device as well as the real-time signal strength between the root node candidate and the router, via a probe response packet (as shown in FIG. 2), to all the other requesting devices, and periodically broadcasts and transmits the MAC address and the real-time signal strength, via a beacon (as shown in FIG. 2), to all the other devices, so as to complete voting for the root node candidate.

The step S3 specifically includes the steps of:

S31) in the mesh network, all devices separately perform the another scanning, and extract, from the received probe response packets and beacons transmitted by all the other devices, the root node candidate elected by each of the other devices;

S32) according to the root node candidates elected by all the other devices, it is determined whether there is only the unique root node candidate; if so, this root node candidate actively connects to the router and acts as a formal root node in the mesh network; otherwise it proceeds to S33;

S33) according to the root node candidates elected by all the other devices, each device counts a number of votes for electing itself;

S34) each device separately compares the real-time signal strength between the device itself and the router and the real-time signal strengths between the root node candidates elected by all the other devices and the router, and elects therefrom a candidate having the maximum real-time signal strength as the new root node candidate; and S35) each device that has received probe request packets transmitted from the other devices unicasts and transmits a MAC address of the new root node candidate elected by the device as well as the real-time signal strength between the root node candidate and the router, via a probe response packet (as shown in FIG. 2), to all the other requesting devices, and periodically broadcasts and transmits the MAC address and the real-time signal strength, via a beacon (as shown in FIG. 2), to all the other devices, so as to complete a new round of voting for the root node candidate, and then it returns to S31.

Among the above steps, S3 is repeated multiple times for avoiding the occurrence of multiple root nodes at the same time in the mesh network due to unstable real-time signal strengths; thus, S3 may be repeated multiple times according to the number of all the devices in the mesh network, so that finally all the devices would generate the unique root node through voting.

In the step S33, if, after counting, a certain device is found to be elected as the root node candidate in information received from all the other devices, this device actively connects to the router and acts as the formal root node in the mesh network.

In the method for electing a root node in a mesh network according to the present invention, when there is already a root node in the mesh network and the root node is not an optimal root node, then before the step S, the method further includes: S0) any device in the mesh network initiates a takeover request which is then broadcast and transmitted by an existing root node; and after the step S3, the method further includes: S4) the elected new root node takes over the existing root node and connects to the router.

The step S0 specifically includes the steps of:

S01) any other device in the mesh network initiates the takeover request to the existing root node, or the existing root node actively initiates the takeover request;

S02) the existing root node broadcasts and transmits information about its upcoming termination; and S03) the other devices in the mesh network receive the information broadcast and transmitted by the existing root node about its upcoming termination, and determine that there will be no root node in the mesh network.

The step S4 specifically includes the steps of:

S41) the elected new root node actively transmits the root node takeover request to the existing root node;

S42) after receiving the takeover request, the existing root node replies to the new root node with confirmation information and actively disconnects from the router;

S43) the existing root node reselects a device in the mesh network as a parent node and connects to the parent node; and S44) after receiving the confirmation information, the new root node disconnects existing connections with the other devices, actively connects to the router, and becomes the formal root node in the mesh network.

Figure 3:
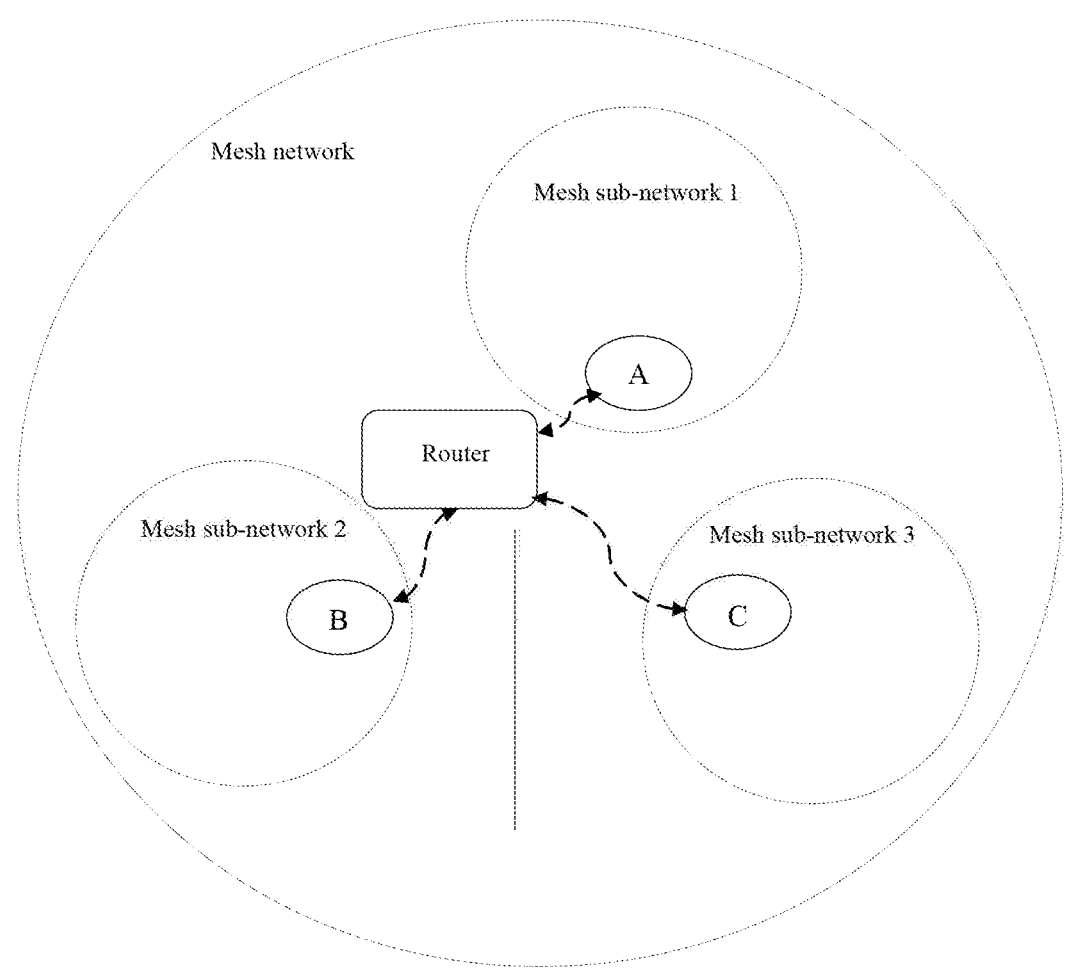
FIG. 3 is a schematic diagram of a particular embodiment of a method for electing a root node in the mesh network according to the present invention.

As shown in FIG. 3 which shows a particular embodiment of a method for electing a root node in the mesh network according to the present invention, the method of the present invention may be applied to automatically elect a root node B in the mesh network which has the optimal connection strength with the router. Specifically, in the mesh network, the devices in a mesh sub-network 1 vote for and elect a root node candidate A, the devices in a mesh sub-network 2 vote for and elect a root node candidate B, and the devices in a mesh sub-network 3 vote for and elect a root node candidate C; the embodiment given herein shows a possibly extreme scenario of the distinctly partitioned regions during arrangement of the mesh network, where there are distinct regional sub-blocks and devices may not be scannable to each other; however, the method of the present invention may effectively handle the root node election under such an extreme situation.

The devices in the mesh sub-network 1 and in the mesh sub-network 2 may be scannable to each other, the devices in the mesh sub-network 1 and in the mesh sub-network 3 may be scannable to each other, but the devices in the mesh sub-network 2 and in the mesh sub-network 3 may not be scannable to each other and thus are unable to transmit and receive messages. Thus, the root node candidate A of the mesh sub-network 1, when comparing with the root node candidate C of the mesh sub-network 3, is voted for and elected as the new root node candidate by the mesh sub-network 3. However, the root node candidate B of the mesh sub-network 2, when comparing with the root node candidate A of the mesh sub-network 1, is voted for and elected as the new root node candidate by the mesh sub-network 1. Therefore, B is elected by voting as the formal and unique root node in the entire mesh network, and B actively connects to the router to become the egress device connecting the mesh network with the external network.

In summary, the method for electing the root node in the mesh network according to the present invention is a method for generating the root node by scanning devices in the network, comparing signal strengths, and voting, wherein signal strengths and other information of devices may be transferred to one another in an entire mesh network, so that all devices may participate in comparison and voting to elect an optimal root node, so as to effectively avoid the occurrence of multiple root nodes due to failure of scanning each other among devices in the network and thus failing to directly compare the signal strength values between each of all the devices and the router.

Although the content of the present invention has been described in detail through the aforementioned preferred embodiments, it should be recognized that the above description should not be considered as limiting the present invention. Upon reading the aforementioned content, it will be apparent to those skilled in the art that various modifications and substitutions may be made to the present invention. Therefore, the protection scope of the present invention shall be defined by the appended claims.

The invention claimed is:

1. A method for electing a root node in a mesh network, comprising the steps of:

S1) when it is determined that there is no root node in the mesh network, all devices in the mesh network separately broadcast and transmit real-time signal strengths between the devices and a router, wherein the step S1 comprises the steps of:

S11) in the mesh network, each device separately periodically broadcasts and transmits the real-time signal strength between the device itself and the router via a beacon, to all the other devices; and S12) in the mesh network, each device that has received probe request packets from the other devices separately replies to all requesting devices by, sending thereto the real-time signal strength between the device itself and the router via a probe response packet; and S2) all the devices in the mesh network separately perform a first scanning, and each device elects, according to received real-time signal strengths between the other devices and the router as well as a real-time signal strength between the device and the router, a device having a maximum real-time signal strength as a root node candidate and broadcasts and transmits the root node candidate, wherein the step S2 comprises the steps of:

S21) in the mesh network, all the devices separately perform the first scanning, and extract, from received probe response packets and beacons transmitted by all the other devices, the real-time signal strength between each of all the other devices and the router;

S22) each device separately compares the received real-time signal strengths between the other devices and the router and the real-time signal strength between the device itself and the router, and elects therefrom a device having the maximum real-time signal strength as the root node candidate; and S23) each device that has received probe request packets transmitted from the other devices unicasts and transmits a MAC address of the root node candidate elected by the device as well as the real-time signal strength between the root node candidate and the router, via a probe response packet, to all the other requesting devices, and periodically broadcasts and transmits the MAC address and the real-time signal strength between the root node candidate and the router, via a beacon, to all the other devices, so as to complete voting for the root node candidate; and S3) all the devices in the mesh network separately perform another scanning, and each device elects, from received root node candidates respectively elected by the other devices, a root node candidate having a maximum signal strength as a new root node candidate and broadcasts and transmits the new root node candidate again until a unique root node in the mesh network is elected.

2. The method for electing a root node in a mesh network according to claim 1, wherein the step S3 specifically comprises the steps of:

S31) in the mesh network, all the devices separately perform the another scanning, and extract, from received probe response packets and beacons transmitted by all the other devices, the root node candidate elected by each of the other devices;

S32) according to the root node candidates elected by all the other devices, it is determined whether there is only the unique root node candidate; if so, this root node candidate actively connects to the router and acts as a formal root node in the mesh network; otherwise it proceeds to S33;

S33) according to the root node candidates elected by all the other devices, each device counts a number of votes for electing itself;

S34) each device separately compares the real-time signal strength between the device itself and the router and the real-time signal strengths between the root node candidates elected by all the other devices and the router, and elects therefrom a candidate having the maximum real-time signal strength as the new root node candidate; and S35) each device that has received probe request packets transmitted from the other devices unicasts and transmits a MAC address of the new root node candidate elected by the device as well as the real-time signal strength between the root node candidate and the router, via a probe response packet, to all the other requesting devices, and periodically broadcasts and transmits the MAC address and the real-time signal strength between the root node candidate and the router, via a beacon, to all the other devices, so as to complete a new round of voting for the root node candidate, and then it returns to S31.

3. The method for electing a root node in a mesh network according to claim 2, wherein in the step S33, if, after counting, a certain device is found to be elected as the root node candidate in information received from all the other devices, this device actively connects to the router and acts as the formal root node in the mesh network.

4. The method for electing a root node in a mesh network according to claim 3, wherein when there is already a root node in the mesh network and the root node is not an optimal root node, then before the step S1, the method further comprises: S0) any device in the mesh network initiates a takeover request which is then broadcast and transmitted by an existing root node; and after the step S3, the method further comprises: S4) the elected new root node takes over the existing root node and connects to the router.

5. The method for electing a root node in a mesh network according to claim 4, wherein the step S0 specifically comprises the steps of:

S01) any other device in the mesh network initiates the takeover request to the existing root node, or the existing root node actively initiates the takeover request;

S02) the existing root node broadcasts and transmits information about its upcoming termination; and S03) the other devices in the mesh network receive the information broadcast and transmitted by the existing root node about its upcoming termination, and determine that there will be no root node in the mesh network.

6. The method for electing a root node in a mesh network according to claim 4, wherein the step S4 specifically comprises the steps of:

S41) the elected new root node actively transmits the root node takeover request to the existing root node;

S42) after receiving the takeover request, the existing root node replies to the new root node with confirmation information and actively disconnects from the router;

S43) the existing root node reselects a device in the mesh network as a parent node and connects to the parent node; and S44) after receiving the confirmation information, the new root node disconnects existing connections with the other devices, actively connects to the router, and becomes the formal root node in the mesh network.

* * * * *

UNITED STATES PATENT AND TRADEMARK OFFICE
CERTIFICATE OF CORRECTION

| | |
|---|---|
| PATENT NO. | : 11,317,467 B2 |
| APPLICATION NO. | : 16/619302 |
| DATED | : April 26, 2022 |
| INVENTOR(S) | : Jiangjian Jiang et al. |

It is certified that error appears in the above-identified patent and that said Letters Patent is hereby corrected as shown below:

In the Claims

Claim 1, Column 7, Line 1, reads:
"rately replies to all requesting devices by, sending"
Should read:
--rately replies to all requesting devices by sending--

Signed and Sealed this
Twelfth Day of July, 2022

Katherine Kelly Vidal
*Director of the United States Patent and Trademark Office*